United States Patent
Wittke et al.

(10) Patent No.: US 11,609,954 B2
(45) Date of Patent: Mar. 21, 2023

(54) SEGMENT CREATION IN A DATABASE SYSTEM

(71) Applicant: Salesforce.com, Inc., San Francisco, CA (US)

(72) Inventors: Eric Paul Wittke, San Francisco, CA (US); Narinder Pal Singh, Bellevue, WA (US); Laurel Knell, San Francisco, CA (US); Jonathan Belkowitz, San Francisco, CA (US); Bradly Zavakos, Indianapolis, IN (US); Laurel Tripp, San Francisco, CA (US); Abigail Kutruff, San Francisco, CA (US); Michael Aurelio, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/902,004

(22) Filed: Jun. 15, 2020

(65) Prior Publication Data

US 2021/0390142 A1    Dec. 16, 2021

(51) Int. Cl.
  *G06F 16/9038* (2019.01)
  *H04L 67/10* (2022.01)
  *H04L 67/306* (2022.01)

(52) U.S. Cl.
  CPC ........ *G06F 16/9038* (2019.01); *H04L 67/10* (2013.01); *H04L 67/306* (2013.01)

(58) Field of Classification Search
  CPC .... G06F 16/9038; G06F 16/9535; G06F 9/46; G06F 9/44505; H04L 67/10; H04L 67/306; H04L 29/08; H04L 67/22; G06Q 50/26; G06Q 50/01; G06Q 30/26; G06Q 30/0271; G06Q 30/0277
  USPC ......................................... 707/769
  See application file for complete search history.

(56) References Cited

U.S. PATENT DOCUMENTS

| | | | | |
|---|---|---|---|---|
| 2008/0243799 | A1* | 10/2008 | Rozich ............... | G06F 16/9535 |
| 2011/0258049 | A1* | 10/2011 | Ramer .............. | G06Q 30/0273 705/14.69 |
| 2014/0019206 | A1* | 1/2014 | Kraus ................... | G06Q 10/04 705/7.31 |
| 2014/0019207 | A1* | 1/2014 | Kraus ................... | G06Q 30/02 705/7.31 |
| 2016/0065637 | A1* | 3/2016 | O'Malley ............ | H04L 65/612 709/231 |
| 2016/0125041 | A1* | 5/2016 | Smith ................ | G06Q 30/0254 707/770 |
| 2016/0253763 | A1* | 9/2016 | Xu ........................ | H04L 67/535 705/319 |
| 2016/0283740 | A1* | 9/2016 | Roundtree ............ | H04L 63/104 |
| 2017/0091849 | A1* | 3/2017 | Greystoke ............ | G06F 16/951 |

(Continued)

*Primary Examiner* — James N Fiorillo
(74) *Attorney, Agent, or Firm* — Polygon IP, LLP

(57) ABSTRACT

Described herein are systems, apparatus, methods and computer program products configured for actions to be performed on segments within a pipeline. The disclosed systems and techniques allow a user to select a data segment on a graphical user interface. The user may then utilize the data of the segment to perform one or more actions. Thus the data of the segment may be used to provide communications to parties contained within the data, manipulate the data segment based on the parties contained within the data, and change the data displayed based on attributes selected.

17 Claims, 10 Drawing Sheets

(56) References Cited

U.S. PATENT DOCUMENTS

| | | | |
|---|---|---|---|
| 2018/0219969 A1* | 8/2018 | Filev | G10L 15/1822 |
| 2019/0026786 A1* | 1/2019 | Khoury | G06Q 30/0271 |
| 2019/0230104 A1* | 7/2019 | Bearley | G06F 16/955 |
| 2019/0235847 A1* | 8/2019 | Nguyen | G06F 11/36 |
| 2019/0235988 A1* | 8/2019 | Janjua | G06F 21/562 |
| 2020/0099771 A1* | 3/2020 | Hsu | H04L 67/1097 |
| 2020/0125238 A1* | 4/2020 | Vadapandeshwara | G06F 16/113 |
| 2020/0184049 A1* | 6/2020 | Toth | H04L 67/306 |
| 2020/0342999 A1* | 10/2020 | Rubin | G06Q 50/26 |
| 2020/0387836 A1* | 12/2020 | Nasr-Azadani | G06N 20/20 |
| 2021/0136027 A1* | 5/2021 | Barbitta | G06Q 10/067 |
| 2021/0194976 A1* | 6/2021 | Sunkara | H04L 67/535 |
| 2021/0209675 A1* | 7/2021 | Deo | H04L 67/535 |
| 2021/0263949 A1* | 8/2021 | Cox | G06F 16/258 |

* cited by examiner

SEGMENT CREATION IN A DATABASE SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to database systems and more specifically to client-server communication for interacting with database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One use of a cloud computing system is a network-accessible database system. A database system associated with a cloud computing service provider may store information associated with various organizations accessing computing services via the service provider.

Another use of a cloud computing system is interacting with database objects. A user interface may provide a vehicle for viewing and editing information stored in a database. The user interface may be presented in a webpage accessible via a web browser. Alternatively, or additionally, a native application or other access mechanism may be employed.

BRIEF DESCRIPTION OF THE DRAWINGS

The included drawings are for illustrative purposes and serve only to provide examples of possible structures and operations for the disclosed inventive systems, apparatus, methods and computer program products for database system user interface segmenting. These drawings in no way limit any changes in form and detail that may be made by one skilled in the art without departing from the spirit and scope of the disclosed implementations.

DETAILED DESCRIPTION

Figure 1:
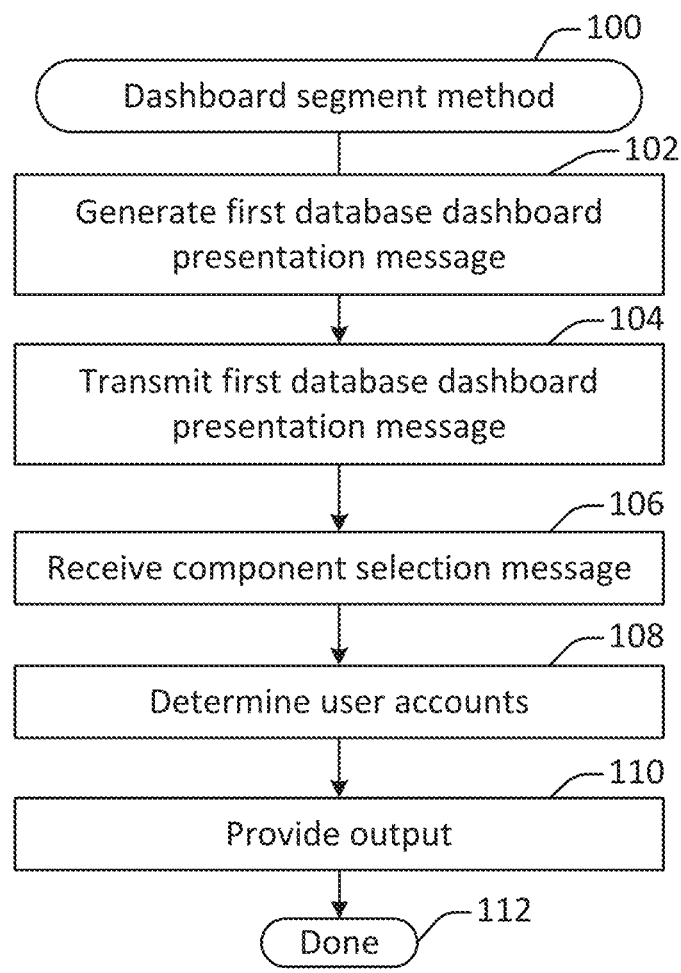
FIG. 1 illustrates an example overview method for user interface segmenting, performed in accordance with one or more embodiments.

Some implementations of the disclosed systems, apparatus, methods and computer program products are configured for user interface segmenting. A system may transmit a first database dashboard presentation message from a database system to a client machine via a network, receive a component selection message, determine a plurality of user accounts based on the component selection message, and transmit a message to each of the plurality of user accounts.

Specifically, the disclosed systems and techniques allow for a user to select a data segment on a graphical user interface. The user may then utilize the data of the segment to perform one or more actions. Thus, for example, the data of the segment may be used to provide communications to parties contained within the data, manipulate the data segment based on the parties contained within the data, and change the data displayed based on attributes selected.

In a first example, Rotti is a marketing manager at MMM, Inc. He uses a marketing visualization software to perform pipeline analysis. The marketing visualization software allows Rotti to track sales conversions from initial contact to sales conversion. However, according to conventional techniques, Rotti may view pipeline analysis. Conventional techniques do not allow for segmenting of various portions of the pipeline. Thus, Rotti would be unable to analyze or contact users based on segments within the pipeline.

Rotti would prefer to segment certain portions of the data shown in the pipeline, which his current program is unable to perform. Being able to segment would allow Rotti to contact perspective customers that showed certain characteristics or responded at certain points of the marketing outreach. Additionally, Rotti would also like to adjust the visualization of the pipeline based on his selected segments to perform further detailed analysis.

According to the techniques described herein, Rotti would be able to select certain segments of the pipeline shown in the visualization software as well as select additional characteristics. Based on the selection, the systems and techniques described herein would determine accounts or parties associated with the selected segments and/or characteristics. Rotti would then be able to contact the accounts or parties associated with the selected segments and/or characteristics. Furthermore, the systems and techniques described herein may allow for visualizations to be modified based on the selected segments and/or characteristics. In certain embodiments, a plurality of segments and/or characteristics may be selected. The system may allow for each of the plurality of characteristics to be included and/or excluded based on the selections. Such systems and techniques allow for improved techniques of manipulating data stored within a database, expanded graphical user interface capabilities, and improved processing times for segmenting database data shown on a visualization by decreasing the processing steps needed to display and manipulate data.

FIG. 1 illustrates an example overview method 100 for user interface segmenting, performed in accordance with one or more embodiments. The method 100 may be performed at a client device and a server system in communication. For example, the method 100 may be performed at one or more of the systems and devices shown in FIGS. 8, 9A, 9B, and 10.

A first database dashboard presentation message is generated in 102 by the server system. The first database dashboard presentation message may allow for a client device of a user to present a first database dashboard on a display screen of the client device. In various embodiments, the first database dashboard may be generated from data contained within a database. Thus, for example, the first database dashboard may query the database and generate a representation communicating various sales data. For example, the first database dashboard may illustrate a representation of a pipeline with a plurality of stages. The representation may show the number of contacts achieved at each stage of the pipeline. The first database dashboard presentation message may, thus, include data that provides instructions to the client device for display of the first database dashboard presentation.

The server system transmits the first database dashboard presentation message to the client device in 104. Transmission of the first database dashboard presentation message may be via any wired and/or wireless communications techniques such as through wired internet connections, WiFi, Bluetooth®, wireless data networks such as 4G, 5G, and other such networks, and other data connections.

Upon receiving the first database dashboard presentation message, the client device may display the first database dashboard. The first database dashboard may include a plurality of segments. The segments may, for example, represent data at each stage of a pipeline. In the various techniques described herein, a user of the client device may select one or more of the segments.

Thus, in the example of Rotti, MMM, Inc. has upgraded their system to operate with the techniques described herein. Rotti then loads a pipeline that indicates all contacts from initial contact to sales conversion. The pipeline is divided into a plurality of segments. Each segment of the pipeline is configured to be proportional to the number of users that were engaged during that stage of the conversion process.

Additionally, in the techniques described herein, upon selecting the one or more segments, the user of the client device may select one or more characteristics associated with one or more accounts within the segments. Thus, various components of the first database dashboard may be selected by the user. The selections may be communicated from the client device to the server system through one or more messages. Such messages may be communicated through various wired and/or wireless communications techniques, as described herein, and may be in a format appropriate for analysis by the server system. The one or more messages may include data indicating selection of components by the user of the client device. Accordingly, during analysis, Rotti selects the segment associated with users that responded to an e-mail inquiry. Rotti's computing device then creates and sends a message to MMM, Inc.'s server system indicating Rotti's selection.

The one or more messages provided by the client device may be received by the server system in 106. The server system, upon receiving the one or more messages, may analyze the one or more messages. The server system may determine one or more user accounts associated with the component selections in 108. Thus, for example, the component selection may be of a segment present within the first database dashboard. In 108, the identity of one, some, or all accounts within the segment may be identified. Thus, in Rotti's example, the server system, after receiving the message indicating Rotti's selection, determines the identity of all accounts that responded to an e-mail inquiry.

In certain embodiments where a plurality of segments and/or characteristics are selected, the message may indicate whether accounts associated with the selections are to be included, excluded, and/or used to perform in another action. In certain embodiments, the server system may, by default, include or exclude the accounts.

The server system may maintain the accounts within one or more databases. The database may be accessible in the context of an on-demand computing services environment configured to provide computing services to a variety of organizations via the internet. The accounts may be tagged based on their participation within the segments. Thus, for example, an account that received the e-mail inquiry, but did not respond, may be tagged so that it is a part of the e-mail inquiry segment, but not a part of the e-mail inquiry response segment. Likewise, another account that received the e-mail inquiry and responded to the e-mail inquiry may be tagged for both receiving and responding to the e-mail inquiry. In certain other embodiments, each segment may include its own database. Thus, accounts contacted by the e-mail inquiry may be contained within a first database while accounts that responded to the e-mail inquiry may be contained within a second database. In certain embodiments, the database may, variously, store information such as user accounts, marketing operations, sales information, service information, and/or any other suitable data.

Based on the user accounts determined, an output may be provided in 110. The output may be, for example, a message provided to the client device allowing for the user of the client device to contact the accounts associated with the selected components, data to allow for a second database dashboard to be displayed, and/or for another action to be performed. Thus, for example, MMM, Inc. may, based on Rotti's selection, provide a message for display on Rotti's device that allows for Rotti to provide a follow up message to all parties that responded to the e-mail inquiry. As such, the systems and techniques described herein allow for improved functionality of graphical user interface pipelines, improving the capabilities of electronic devices.

Figure 2:
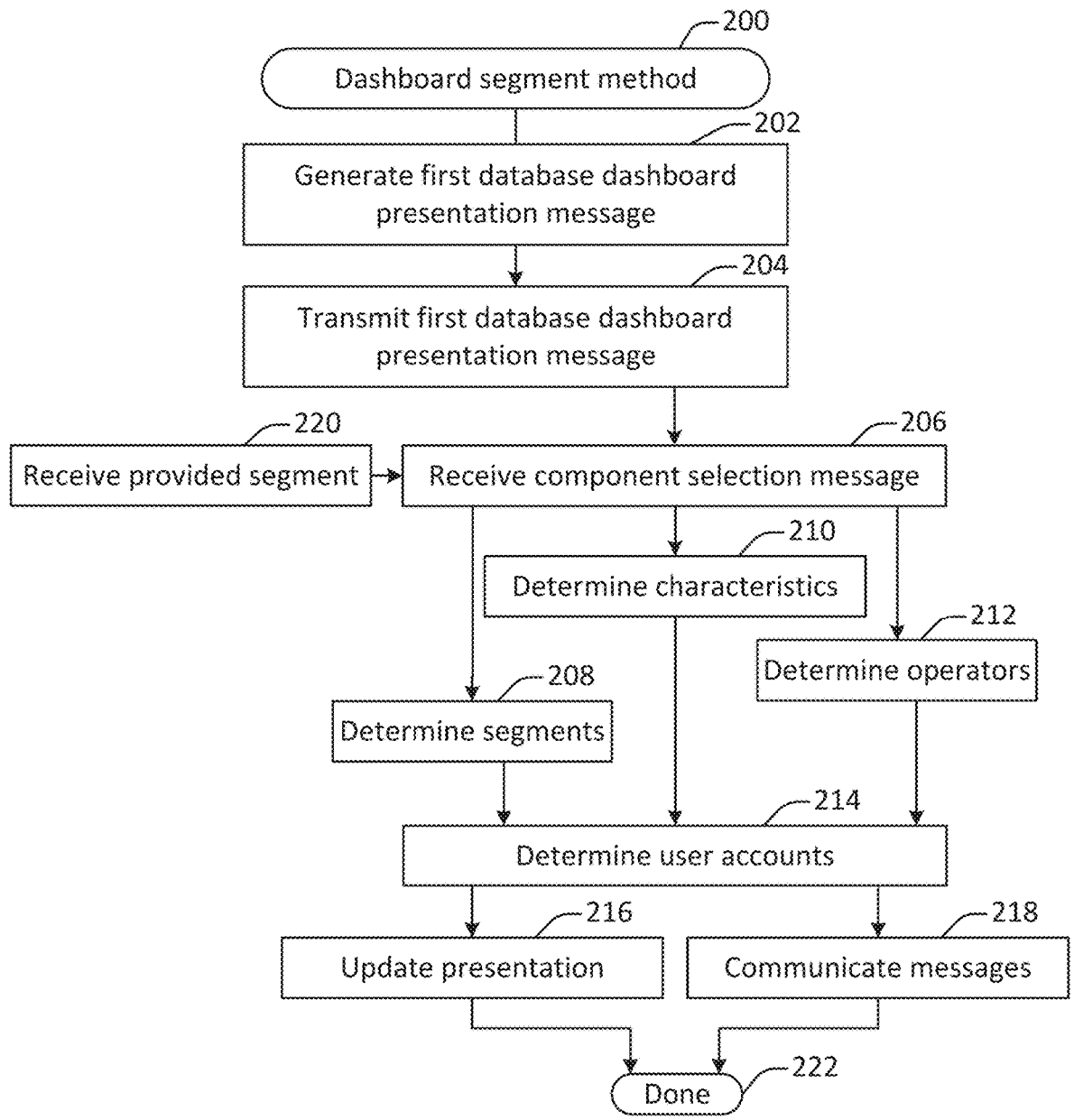
FIG. 2 illustrates an additional example method for user interface segmenting, performed in accordance with one or more embodiments.

FIG. 2 illustrates an additional example method 200 for user interface segmenting, performed in accordance with one or more embodiments. Method 200 of FIG. 2 allows for a server system to provide further techniques of segmenting data for a representation, such as a pipeline representation.

A first database dashboard presentation message is generated in 202. Generating the first database dashboard presentation message in 202 may be similar to generating the first database dashboard presentation message in 102 of FIG. 1.

In some embodiments, database dashboard presentation messages may include information such as data retrieved from a database. Such information may include, for instance, data values associated with data fields included within database objects. In some embodiments, database dashboard presentation messages may include presentation and control information such as HyperText Markup Language (HTML) tags, Cascading Style Sheet (CSS) tags, Javascript computer programming language instructions, and other such information.

According to various embodiments, database dashboard presentation messages may include any information suitable for generating a database dashboard at the client device. Such information may include, but is not limited to: a user identifier, a user interface identifier, one or more user interface component identifiers, one or more database record identifiers, and/or one or more user interface snapshot configuration parameters.

The first database dashboard presentation message may then be transmitted to a client device in 204, similar to 104 of FIG. 1. The first database dashboard presentation message may be configured to cause the client device to generate a first database dashboard, subject to any configuration parameters associated database dashboard generation. The first database dashboard allows for user selection of segments. FIGS. 3-6 described herein are examples of database dashboards. Transmission of the first database dashboard presentation message may be via any wired and/or wireless communications techniques as described herein.

Upon receiving the first database dashboard presentation message, the client device may display the first database dashboard and the user may select one or more segments of the first database dashboard. In the various techniques described herein, a user of the client device may select one or more of the segments. The selection may be communicated from the client device to the server system via a component selection message. The server system may receive the component selection message in 206, similar to 106.

In 220, a provided segment is received by the server system. The provided segment may be, for example, a previously selected segment (such as a default segment associated with the user or a segment previously selected by the user from the same pipeline or from a different pipeline), a segment maintained within a database such as a database of the server system, and/or another such predetermined segment. The provided segment may include one or more contacts. The population of the provided segment may be different from the population of the selected components or may partially or fully overlap.

In 208, the selected segments are determined. The selected segments may be associated with segments selected by the user on the client device as well as the provided segments. Thus, for example, the selected segments may be a union of the segments selected by the user and the provided segments, the intersection of the segments selected by the user and the provided segments (e.g., the overlap of the population of the provided segment and the selected components may be excluded), by subtracting one of the segments from the other (e.g., by subtracting the intersection of the provided segment and the segments selected by the user from the segments selected by the user), or through another technique.

In 210, the characteristics are determined. In various embodiments, characteristics may be certain characteristics selected by the user on the client device. In certain embodiments, upon selecting the segment, the user may further select characteristics. The characteristics may be, for example, traits of the population of the segment that the user wishes to include or exclude. Thus, for example, Rotti may select first and second characteristics for the segment. Only users that are within the population of the segments and that include the first and second characteristics may be determined as appropriate user accounts.

In 212, operators are determined for one or more of the segments and/or characteristics. In certain embodiments, the operators may be associated with one of the segments and/or characteristics. The operators may indicate whether the associated segments and/or characteristics, when used to determine the user accounts, are union, intersection, subtracting, or another operation.

Based on the determined segments, determined characteristics, and operators, the user accounts associated with the component selections and/or the provided segments may be determined in 214. Thus, in a certain embodiment, the user accounts of the various segments with the selected characteristics may be determined. In another embodiment, the user accounts of the various segments that do not include the selected characteristics may be determined. In a further embodiment, user accounts that include the characteristics and/or are a part of the selected segments may be determined. Other embodiments may determine other accounts. The determination of the accounts may be based on the segments, characteristics, and operators. In certain embodiments, the operators may indicate whether to include, exclude, or otherwise determine whether the selected or provided segment and/or characteristic is included within the determined group of user accounts.

In 216, the first database dashboard may be updated with the determined user accounts. Thus, for example, the server system may generate a second database dashboard presentation message. The second database dashboard presentation message may be configured to cause the client device to update the dashboard presentation. In various embodiments, the second database dashboard presentation may be presented based on the determined user accounts. That is, the second database dashboard presentation may be a representation of the user accounts determined in 214.

Alternatively or additionally, in 218, messages may be communicated to the user accounts determined in 214. The messages may be messages provided by the user. Thus, the messages may be follow-up messages, communications of new deals, surveys, and/or other such messages. The determined user accounts of 214 may, thus, allow for more targeted engagement of certain segments and user accounts with certain characteristics in such certain segments.

Figure 3:
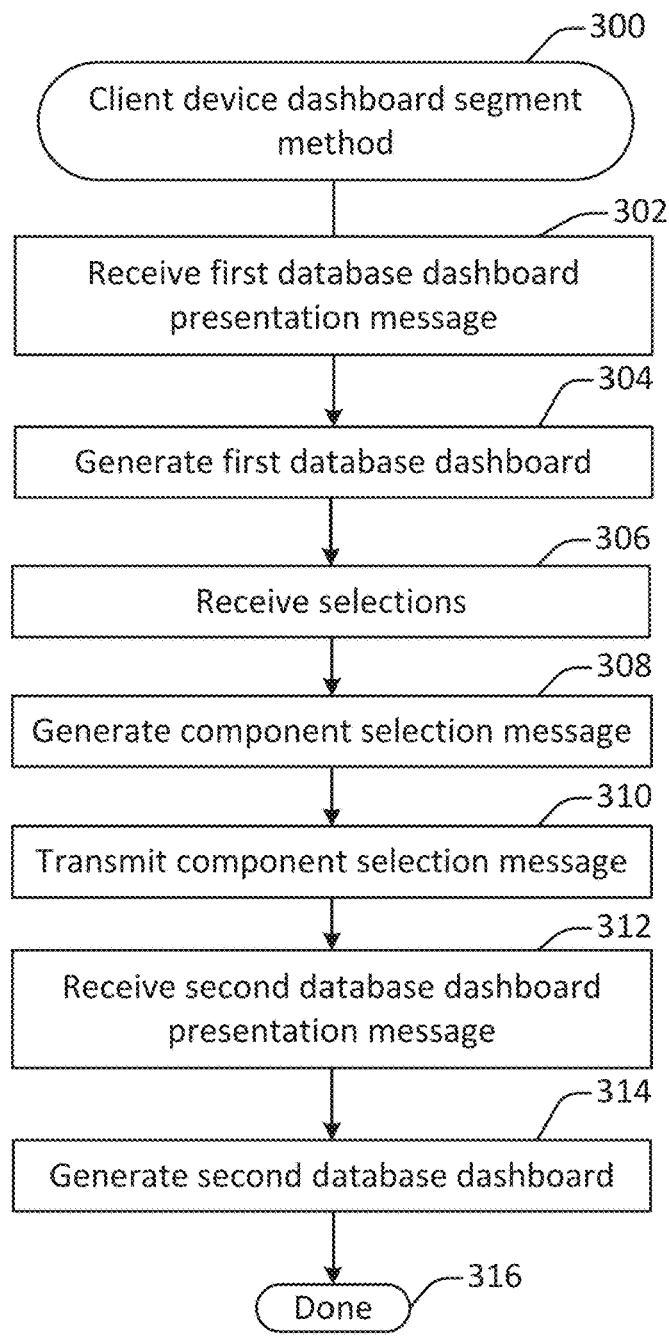
FIG. 3 illustrates an example method for client device dashboard segmenting, performed in accordance with one or more embodiments.

FIG. 3 illustrates an example method for client device dashboard segmenting, performed in accordance with one or more embodiments. FIG. 3 illustrates a technique for a client device to display a database dashboard presentation, as described herein (e.g., in FIGS. 4-7). In 302, a first database dashboard presentation message, as described herein, is received from a server system through one or more communications techniques.

The first database dashboard presentation message may cause the client device to generate a first database dashboard in 304. In various generated of the first database dashboard, based on the first database dashboard presentation message, may be additionally based on one or more configurations of the client device. Thus, for example, the first database dashboard may be generated to fit the screen of the client device, by presenting the first database dashboard in a format preferred by the user, and/or based on another such configuration. In various embodiments, each component of the first database dashboard may be implemented as, for example, a <div>, <iframe>, or other such tag in an HTML context. In some embodiments, the first database dashboard may be generated via a native application. Alternatively or additionally, the first database dashboard may be generated in a web browser.

In 306, user selections of segments and other portions of the first database dashboard may be received via the interface of the client device. In some embodiments, the user selections may be performed through selection of one or more components of the first database dashboard with a pointing device such as a mouse. Alternatively, or additionally, user interface components presented on a touch screen may be identified by selecting them via the touch interface.

Based on the selections, a component selection message is generated in 308. The component selection message may include data directed to the user selection. Thus, for example, the component selection message may include data indicating components of the first database dashboard that was selected by the user, such as the segments and/or characteristics selected. Additionally, the component selection message may include other data such as operators associated with the selections and data indicating actions to be taken by the selection. The component selection message may be transmitted to the server system in 310.

Based on the component selection message, the server system may, in certain embodiments, provide a second database dashboard presentation message. The second database dashboard presentation message may include data configured to cause the client device to display an updated databased dashboard. The client device may receive the second database dashboard presentation message in 312. Based on the second database dashboard presentation message, a second database dashboard is generated and displayed in 314.

Figure 4:
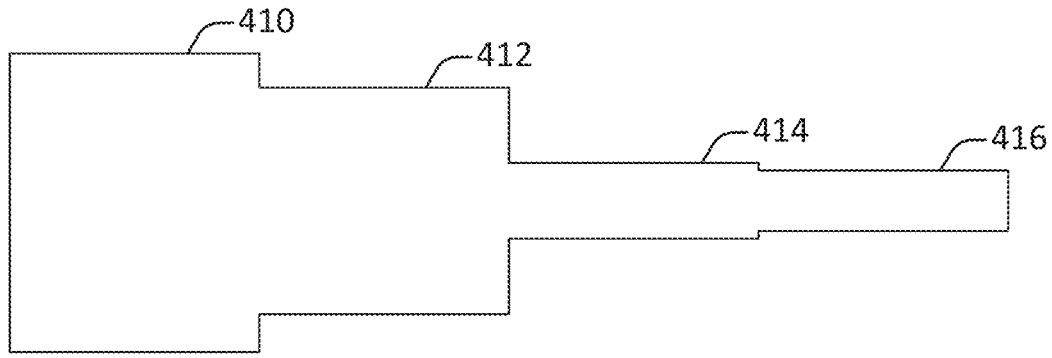
FIG. 4 illustrates an example of a graphical user interface configured in accordance with one or more embodiments.

FIG. 4 illustrates an example of a graphical user interface configured in accordance with one or more embodiments. FIG. 4 illustrates a graphical user interface that includes pipeline 402 and channels 404. The graphical user interface of FIG. 4, as well as the corresponding graphical user interfaces of FIGS. 4-6, may be configured to be displayed on a user interface of a client device.

According to various embodiments, the graphical user interface described herein may be any interface suitable for accessing and displaying information transmitted from a server. For example, the graphical user interface described herein may be used to access information stored in a database of a server system. In some embodiments, the graphical user interface may be generated according to one or more configuration parameters specified. For example, the user, through the client device, may specify parameters for generation of the first database dashboard.

In various embodiments, pipeline 402 may represent a sales pipeline, a production pipeline, another such pipeline, or is another information representation. Pipeline 402 may include a plurality of segments 410-416. Each of segments 410-416 may represent a stage of the pipeline. Thus, in the example of Rotti, segment 410 may represent the parties that were initially contacted via e-mail, segment 412 may represent the parties that replied to the e-mail, segment 414 may represent the parties that visited MMM, Inc.'s website, and segment 416 may represent the parties that purchased an item from MMM, Inc.'s website.

Channels 404 may communicate various categories. The categories may include categories 406-410. The categories may be categories associated with one or more of segments 410-416. Thus, in the example of FIG. 4, segment 412 may be selected. Categories 406-410 may be associated with properties of parties within segment 412. Thus, for example, categories 406-410 may be associated with various different e-mail platforms utilized by the parties that responded to the e-mail inquiry. As such, category 406 may be a first e-mail platform, category 408 may be a second e-mail platform, and category 410 may be a third e-mail platform. In various other embodiments, the categories may represent other categories, such as other platforms of response (e.g., instant messaging, social network, and such platforms), items that the users purchased, payments provided, and/or other such categories.

Each of the categories may also be associated with one or more characteristics. Thus, in the example of Rotti, characteristics 422-448 may be associated with a time of day from when the user responded through the corresponding e-mail platform (e.g., the e-mail platform associated with categories 406, 408, or 410). In other embodiments, other characteristics may be represented, such as demographic data, the amount of time required for the user to respond, the type of engagement with the user, and/or other characteristics. In certain embodiments, the category and characteristics may be associated with the segment and may be appropriate for the segment (e.g., a segment associated with users that purchased items may include categories and characteristics associated with the sale).

Figure 5:
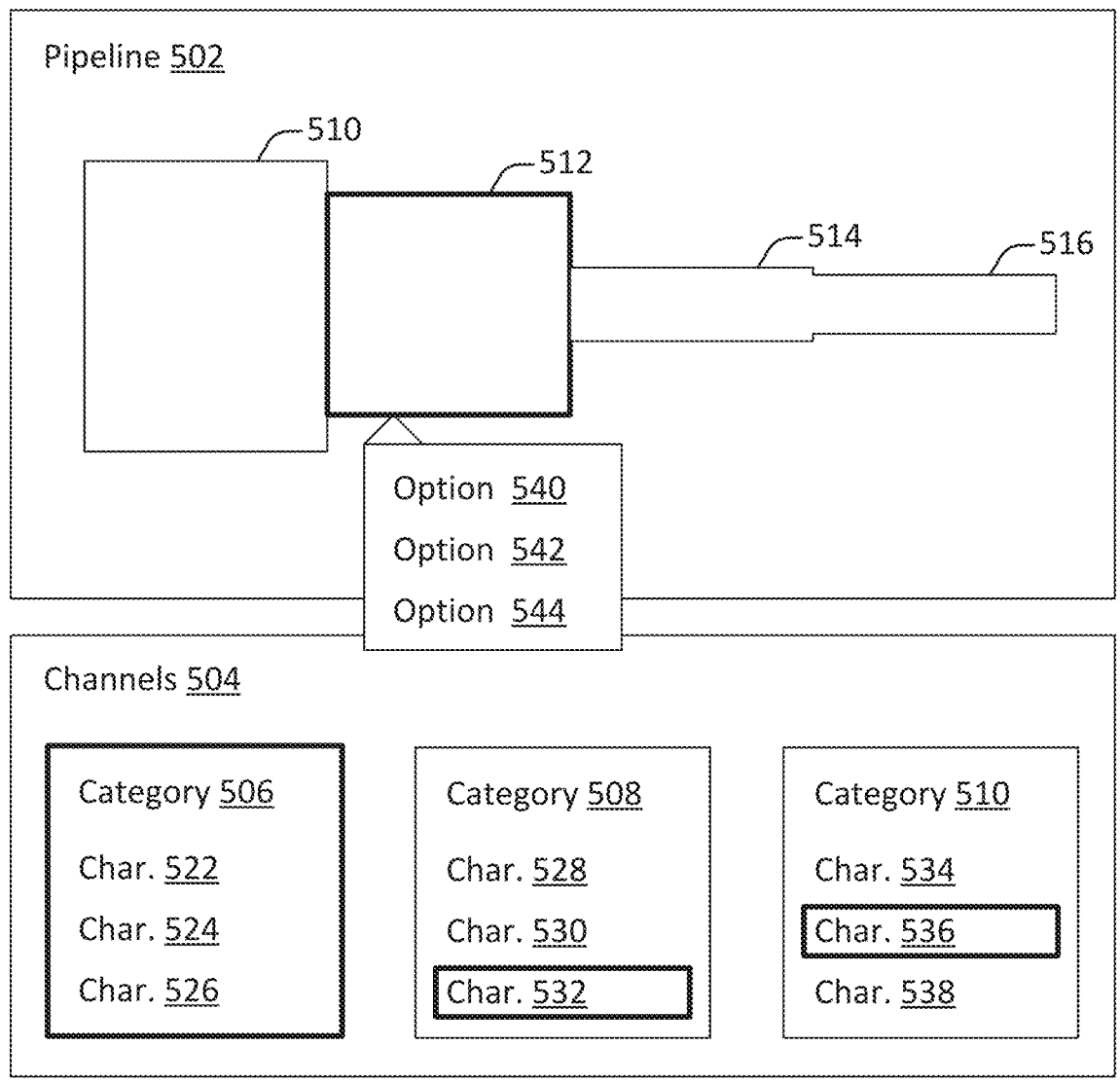
FIG. 5 illustrates another example of a graphical user interface configured in accordance with one or more embodiments.

FIG. 5 illustrates another example of a graphical user interface configured in accordance with one or more embodiments. FIG. 5 illustrates a graphical user interface similar to the graphical user interface of FIG. 4. Thus, in FIG. 5, pipeline 502 and channels 504 may be similar to pipeline 402 and channels 404 of FIG. 4.

Various portions of the graphical user interface of FIG. 5 may be selected by a user, as illustrated in FIG. 5. The selections may then be communicated to a server system and the interface may be updated or additional actions may be performed. An example additional action is further described in FIG. 6 and an example update to the interface is described in FIG. 7.

In FIG. 5, segment 512 has been selected and has been accordingly highlighted. Based on the selection, segment 512 is highlighted to indicate that it has been selected. Based on the selection of segment 512, the graphical user interface may present options 540-544 to the user. Options 540-544 may be options that the user may select based on the selection of segment 512. Thus, in a certain example, option 540 may be an option to create a new segment from the selection, option 542 may be an option to include the existing segment (e.g., add the selected segment 512 to an existing segment), and option 544 may be an option to exclude the existing segment (e.g., exclude segment 512 from any selection). Other selection options may include, for example, creating a copied segment from segment 512 or applying a filter to segment 512.

Based on the selection of segment 512, channels 504 may provide categories 506-510. In certain embodiments, the categories may include additional sub-categories, such as characteristics described herein. As shown in FIG. 5, the user has selected various characteristics. Thus, for example, the user has selected characteristic 532 of category 508 and characteristic 536 of category 510. Characteristics 532 and 536 are accordingly highlighted to illustrate their selection. Additionally, the user selects characteristics 522-526. As selection of characteristics 522-526 correspond to selecting the entirety of category 506, the graphical user interface of FIG. 5 highlights the entirety of category 506.

Figure 6:
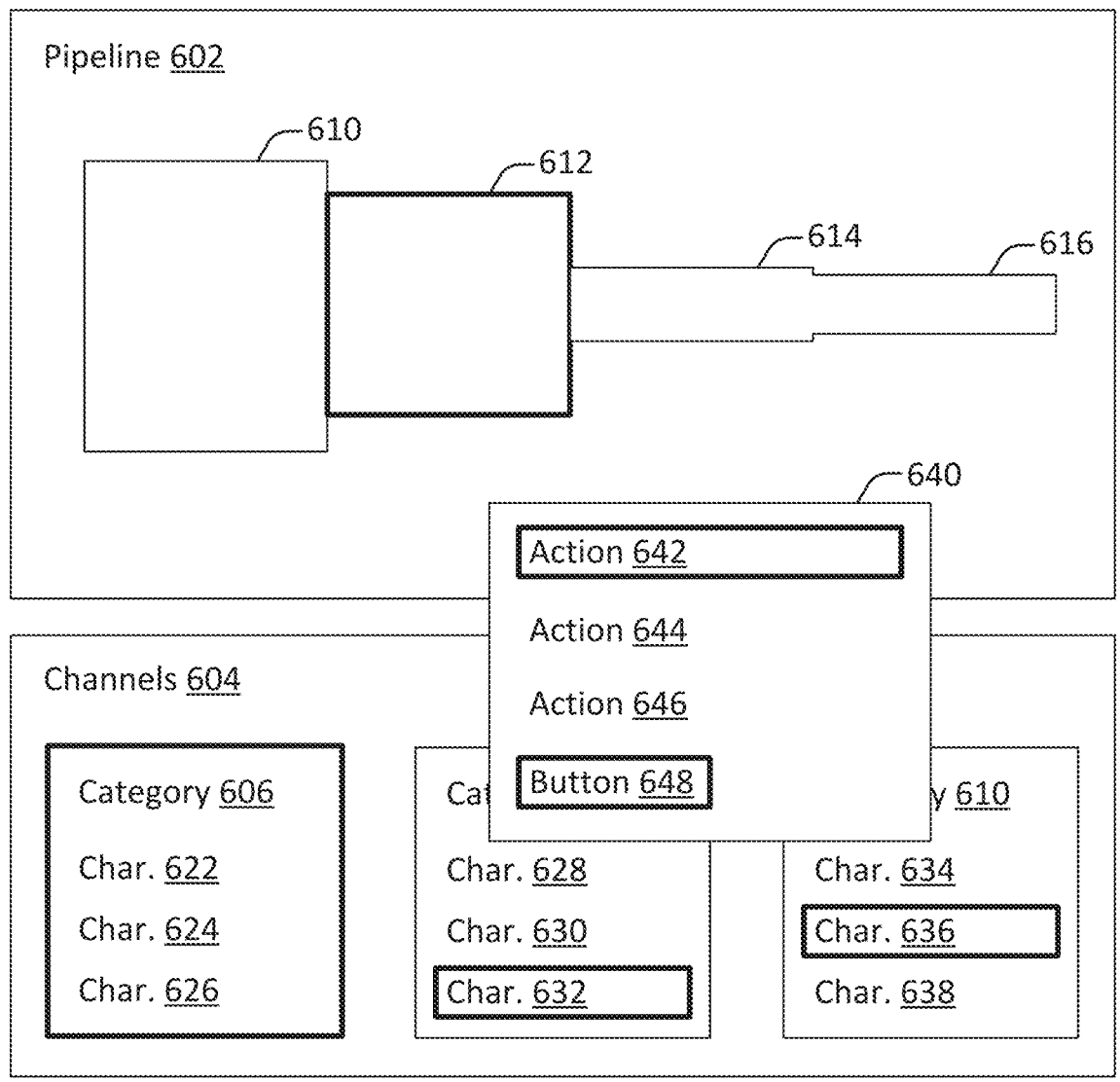
FIG. 6 illustrates a further example of a graphical user interface configured in accordance with one or more embodiments.

Based on the selection in FIG. 5, the graphical user interface may then provide possible actions based on the selections. FIG. 6 illustrates such an interface. FIG. 6 illustrates a further example of a graphical user interface configured in accordance with one or more embodiments. In FIG. 6, segment 612 has been selected and, furthermore, all of category 606 as well as characteristics 632 and 636 have been selected.

Based on the selection, window 640 may be displayed. Window 640 provides various possible actions for the selections of the user. Thus, for example, window 640 may provide actions 642-646 for selection by the user. Actions 642-646 may include actions such as sending communications to the identified accounts, creating a new campaign based on the identified accounts, including additional existing segments (e.g., provided segments), excluding additional existing segments, including the current selections into existing segments, excluding the current selections into existing segments, applying a filter, and/or other such actions. Actions 642-646 may allow a user to further utilize the selected segments and/or characteristics. As such, the segments of the graphical user interface may be utilized in additional processes and/or techniques. Button 648 may allow the user to confirm the selection of one or more of actions 642-646.

Figure 7:
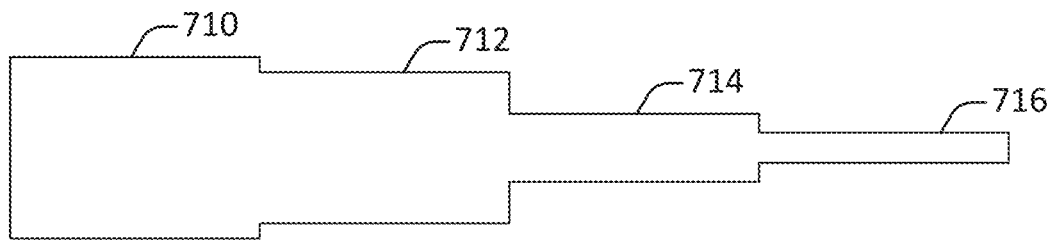
FIG. 7 illustrates an additional example of a graphical user interface configured in accordance with one or more embodiments.

FIG. 7 illustrates an additional example of a graphical user interface configured in accordance with one or more embodiments. FIG. 7 illustrates pipeline 702, which has been modified based on the selections of FIG. 6. As such, pipeline 702 is configured to represent the portion of pipeline 602 that has the characteristics selected (e.g., characteristics 722, 724, 726, 732, and 736). As such, the profile of pipeline 702 is different from that of pipeline 602.

Figure 8:
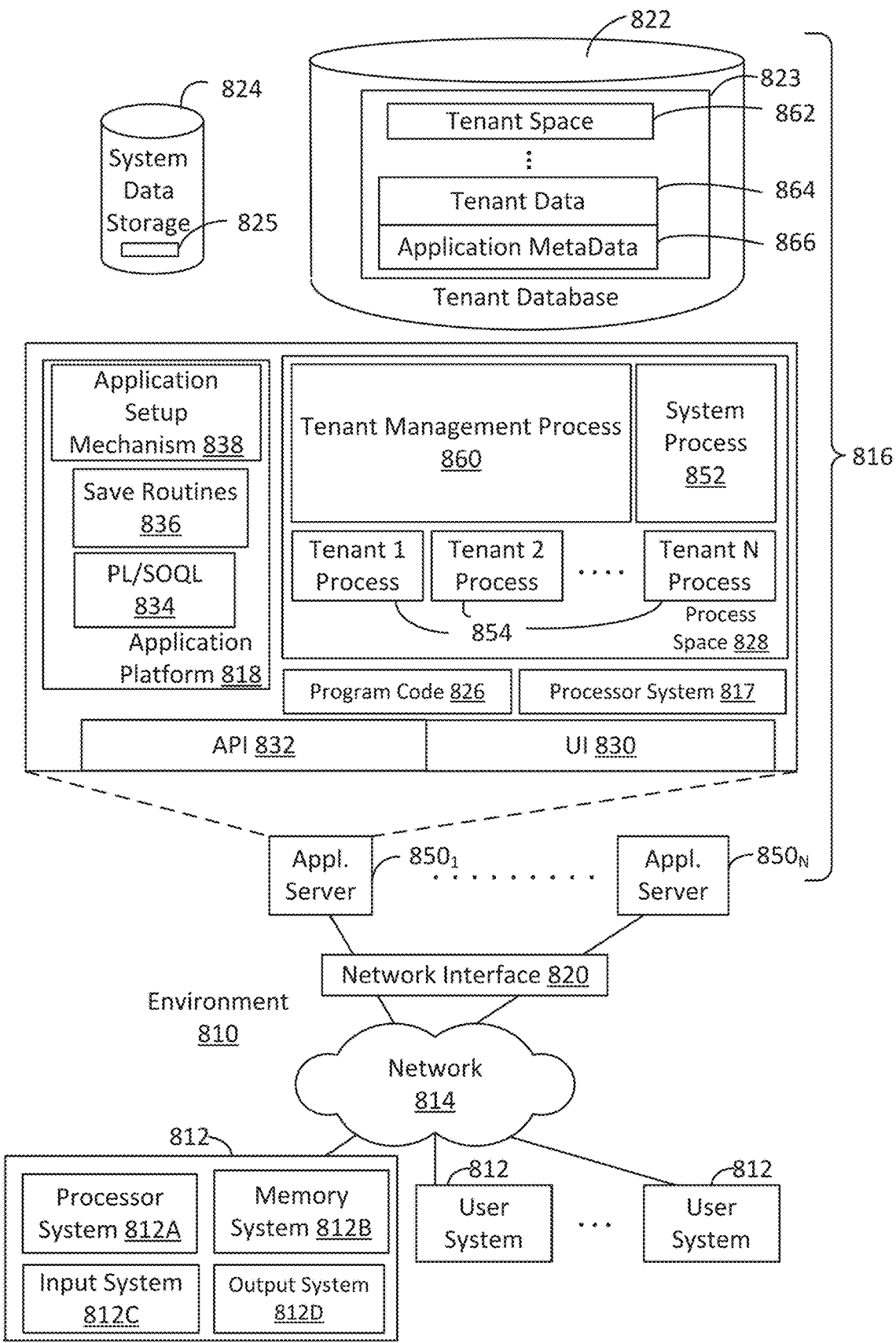
FIG. 8 shows a block diagram of an example of an environment that includes an on-demand database service, configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based selectable segment interface system. For example, in some implementations, system 816 may include application servers configured to implement and execute selectable segment interface software applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a selectable segment interface, a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
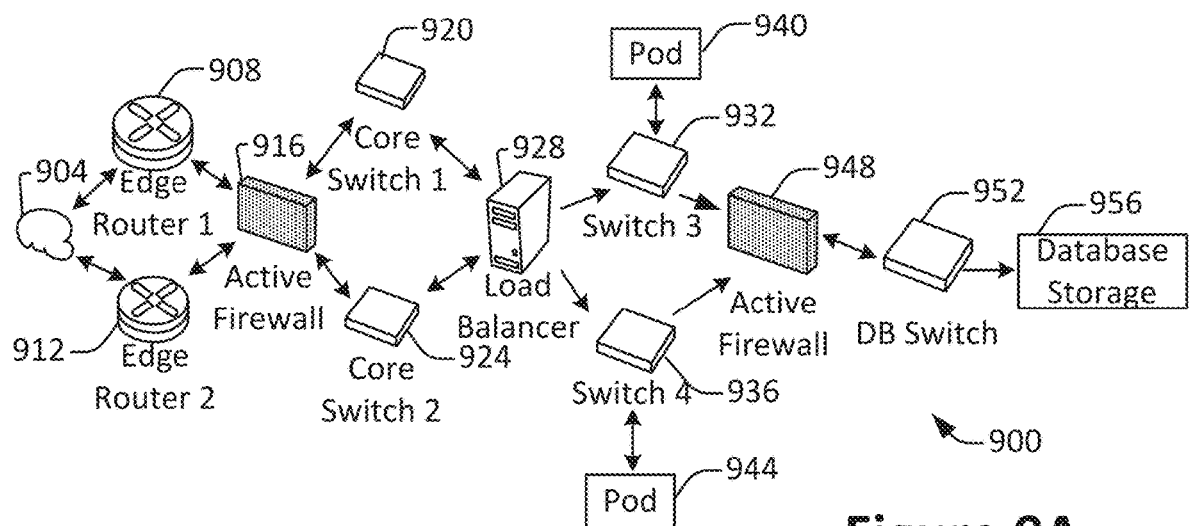
FIGS. 9A and 9B illustrate examples of a computing system, configured in accordance with one or more embodiments.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems 812 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process selectable segment interface information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
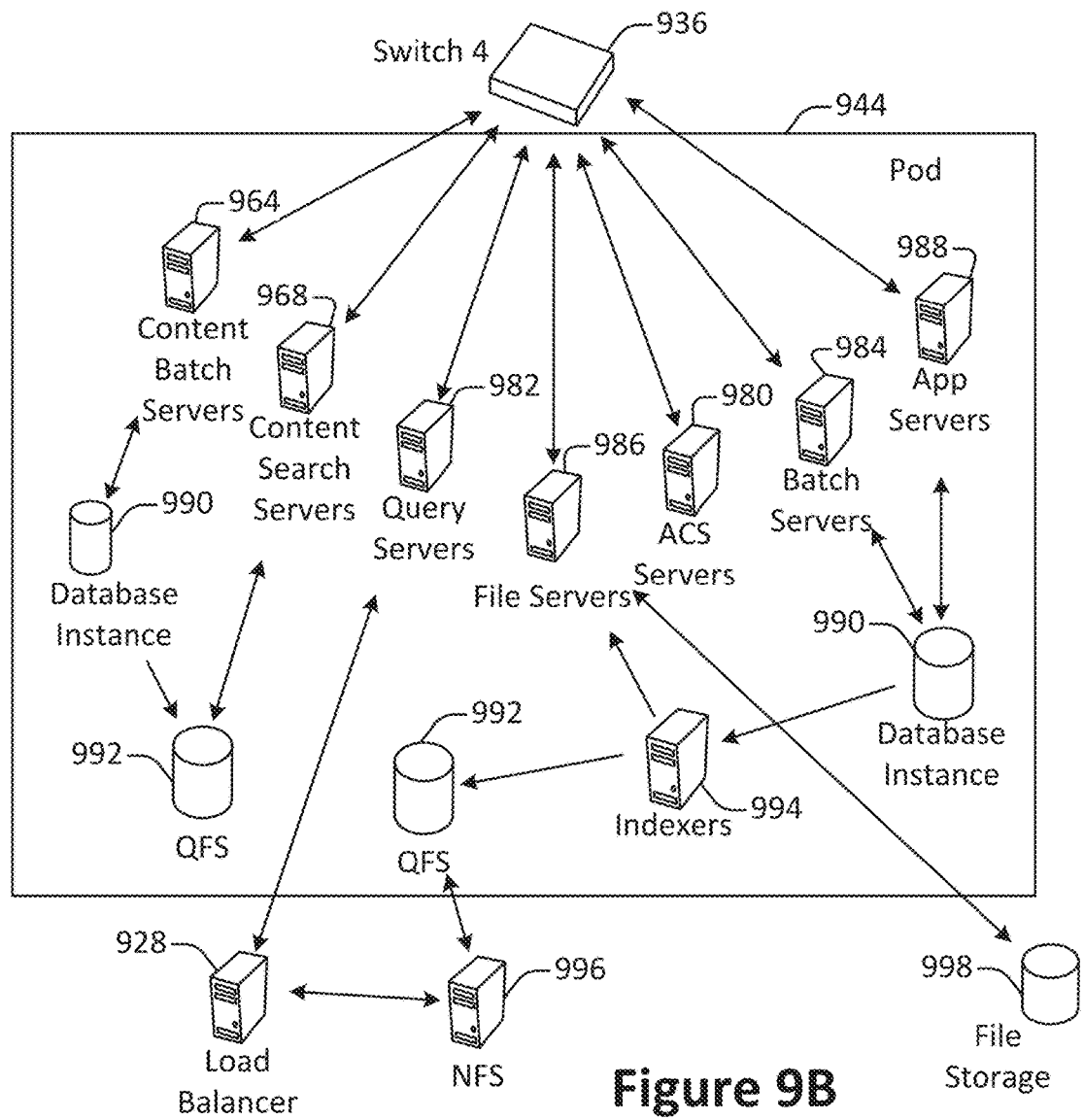

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBs), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
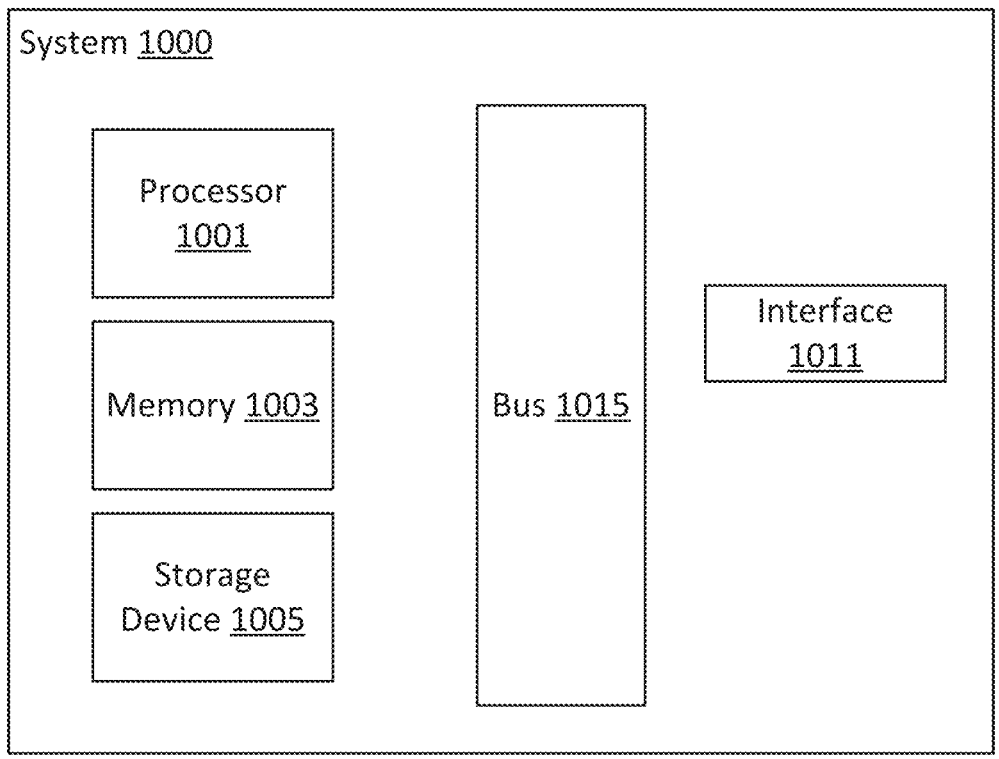
FIG. 10 illustrates an example of a computing device, configured in accordance with one or more embodiments.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computer-implemented method comprising:
  transmitting a first database dashboard presentation message from a database system to a client machine via a network, the first database dashboard presentation message comprising:
    instructions for presenting a first database dashboard on a display screen at the client machine, the first database dashboard including a plurality of user interface components, each user interface component comprising a user selectable graphical representation of a pipeline with a plurality of user selectable segments, the pipeline associated with a process, each user selectable segment corresponding to a stage of the process and configured to provide a respective view of information of user accounts in a database that are associated with the respective stage of the process; and
    the first database dashboard further including one or more interface components comprising a user selectable graphical representation of one or more categories, each of the one or more categories associated with at least one of the plurality of user selectable segments and comprising one or more user selectable characteristics associated with the stage of the process, wherein,
    the first database dashboard enables the client machine to create a component selection message comprising components of the first database dashboard that was selected by the user;
  receiving from the client machine the component selection message, the component selection message identifying one or more of the user selectable user segments and the user selectable characteristics associated with the process;
  determining a plurality of user accounts based on the component selection message, the plurality of user accounts associated with the stages corresponding to each of the identified user selectable segments and wherein the plurality of user accounts each comprises at least one of the one or more user selectable characteristics; and
  transmitting a message to each of the plurality of user accounts.

2. The computer-implemented method of claim 1, wherein the component selection message identifies a plurality of characteristics and further identifies an operator for each of the plurality of characteristics.

3. The computer-implemented method of claim 2, wherein at least a first characteristic and a second characteristic are each are associated with union operators, and wherein the plurality of user accounts each comprises at least one of the first characteristic and the second characteristic.

4. The computer-implemented method of claim 1, wherein the plurality of user accounts is a first plurality of user accounts, and the method further comprises:
  determining a second selection of a further user selectable segment; and
  determining a second plurality of user accounts based on the further user selectable segment, wherein the message is transmitted to user accounts included in one or both of the first plurality and second plurality of user accounts.

5. The computer-implemented method of claim 1, further comprising:
  generating a second database dashboard presentation message based on the determining the plurality of user accounts based on the component selection message, the second database dashboard presentation message comprising instructions for presenting a second database dashboard on the display screen, the second database dashboard comprising one or more user interface components different from the plurality of user interface components of the first database dashboard.

6. The computer-implemented method of claim 1, further comprising:
  generating the first database dashboard presentation message.

7. A computer program product comprising computer-readable program code capable of being executed by one or more processors in a customer dashboard segmentation environment when retrieved from a non-transitory computer-readable medium, the program code comprising instructions configurable to cause operations comprising:
  transmitting a first database dashboard presentation message from a database system to a client machine via a network, the first database dashboard presentation message comprising instructions for:
    presenting a first database dashboard on a display screen at the client machine, the first database dashboard including a plurality of user interface components, each user interface component comprising a user selectable graphical representation of a pipeline with a plurality of user selectable segments, the pipeline associated with a process, each user selectable segment corresponding to a stage of the process and configured to provide a respective view of information of user accounts in a database that are associated with the respective stage of the process and
    the first database dashboard further including one or more interface components comprising a user selectable graphical representation of one or more categories, each of the one or more categories associated with at least one of the plurality of user selectable segments and comprising one or more user selectable characteristics associated with the stage of the process, wherein,
    the first database dashboard enables the client machine to create a component selection message comprising components of the first database dashboard that was selected by the user;
  receiving from the client machine the component selection message, the component selection message identifying one or more of the user selectable segments and the user selectable characteristics associated with the process;

determining a plurality of user accounts based on the component selection message, the plurality of user associated with the stages corresponding to each of the identified user selectable segments and wherein the plurality of user accounts each comprises at least one of the one or more user selectable characteristics; and transmitting a message to each of the plurality of user accounts.

8. The computer program product of claim 7 wherein the component selection message further identifies a plurality of characteristics and further identifies an operator for each of the plurality of characteristics.

9. The computer program product of claim 8, wherein at least a first characteristic and a second characteristic are each are associated with union operators, and wherein the plurality of user accounts each comprises at least one of the first characteristic and the second characteristic.

10. The computer program product of claim 7, wherein the plurality of user accounts is a first plurality of user accounts, and the operations further comprise:

determining a second selection of a further user selectable segment; and determining a second plurality of user accounts based on the further user selectable segment, wherein the message is transmitted to user accounts included in one or both of the first plurality and second plurality of user accounts.

11. The computer program product of claim 7, wherein the operations further comprise:

generating a second database dashboard presentation message based on the determining the plurality of user accounts based on the component selection message, the second database dashboard presentation message comprising instructions for presenting a second database dashboard on the display screen, the second database dashboard comprising one or more user interface components different from the plurality of user interface components of the first database dashboard.

12. The computer program product of claim 7, wherein the operations further comprise: generating the first database dashboard presentation message.

13. A system comprising:

a processor;

a non-transitory memory comprising instructions stored thereon to cause the processor to perform operations comprising:

transmitting a first database dashboard presentation message from a database system to a client machine via a network, the first database dashboard presentation message comprising:

instructions for presenting a first database dashboard on a display screen at the client machine, the first database dashboard including a plurality of user interface components, each user interface component comprising a user selectable graphical representation of a pipeline with a plurality of user selectable segments, the pipeline associated with a process, each user selectable segment corresponding to a stage of the process and configured to provide a respective view of information about user accounts in a database that are associated with the respective stage of the process; and the first database dashboard further including one or more interface components comprising a user selectable graphical representation of one or more categories, each of the one or more categories associated with at least one of the plurality of user selectable segments and comprising one or more user selectable characteristics associated with the stage of the process, wherein, the first database dashboard enables the client machine to create a component selection message comprising components of the first database dashboard that was selected by the user;

receiving from the client machine the component selection message, the component selection message identifying one or more of the user selectable segments;

determining a plurality of user accounts based on the component selection message, the plurality of user accounts associated with the stages corresponding to each of the identified user selectable segments and wherein the plurality of user accounts each comprises at least one of the one or more user selectable characteristics; and transmitting a message to each of the plurality of user accounts.

14. The system of claim 13, wherein the component selection message further identifies a plurality of characteristics and further identifies an operator for each of the plurality of characteristics.

15. The system of claim 14, wherein at least a first characteristic and a second characteristic are each are associated with union operators, and wherein the plurality of user accounts each comprises at least one of the first characteristic and the second characteristic.

16. The system of claim 13, wherein the operations further comprise:

generating a second database dashboard presentation message based on the determining the plurality of user accounts based on the component selection message, the second database dashboard presentation message comprising instructions for presenting a second database dashboard on the display screen, the second database dashboard comprising one or more user interface components different from the plurality of user interface components of the first database dashboard.

17. The system of claim 13, wherein the operations further comprise: generating the first database dashboard presentation message.

* * * * *